United States Patent
Sinha

(10) Patent No.: US 11,665,085 B2
(45) Date of Patent: May 30, 2023

(54) OPTIMIZING SELECTION OF GATEWAYS BASED ON LOCATION AND USER EXPERIENCE RELATED METRICS

(71) Applicant: Citrix Systems, Inc., Fort Lauderdale, FL (US)

(72) Inventor: Ishita Sinha, Noida (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 43 days.

(21) Appl. No.: 17/490,397

(22) Filed: Sep. 30, 2021

(65) Prior Publication Data
US 2023/0119230 A1  Apr. 20, 2023

(51) Int. Cl.
*H04L 45/121* (2022.01)
*H04L 45/00* (2022.01)
*H04L 43/0852* (2022.01)

(52) U.S. Cl.
CPC ........ *H04L 45/121* (2013.01); *H04L 43/0852* (2013.01); *H04L 45/70* (2013.01)

(58) Field of Classification Search
CPC .... H04L 45/121; H04L 43/0852; H04L 45/70
See application file for complete search history.

(56) References Cited

U.S. PATENT DOCUMENTS

| | | | | |
|---|---|---|---|---|
| 10,303,520 | B2* | 5/2019 | Shim | H04W 4/70 |
| 10,938,925 | B1* | 3/2021 | Fitzhugh | H04L 67/52 |
| 11,019,060 | B2* | 5/2021 | Charvet | H04L 67/142 |
| 2014/0362713 | A1* | 12/2014 | Agarwal | H04W 24/08 |
| | | | | 370/332 |
| 2019/0037011 | A1* | 1/2019 | Kumar | H04L 43/0864 |
| 2020/0382580 | A1* | 12/2020 | Devanneaux | H04L 41/147 |
| 2022/0264370 | A1* | 8/2022 | Qiao | H04W 28/0967 |

* cited by examiner

*Primary Examiner* — Hashim S Bhatti

(57) ABSTRACT

Described embodiments provide systems and methods for selecting a device via which to access a server. A service having one or more processors coupled with memory may detect a measure of experience for a client device in accessing a server via a first device being below a threshold. The service may identify, responsive to the detection, a plurality of devices available for the client device to access the server. The service may determine a distance between each of the plurality of devices and at least one of the client device or the server. The service may select a second device from the plurality of devices via which the client device is to access the server based at least on the distance between the second device and at least one of the client device or the server.

18 Claims, 19 Drawing Sheets

| Performance | Operations | | DataSources |
|---|---|---|---|

☐ User Experience (UX) Factors

↙ 705

Filters

Selected users: 1000   Site: All Sites   Time Interval: Nov 3, 2020, 03:45 PM to 05:58 PM IST (UTC+05:30)

∨ User Experience (UX)
☐ Excellent
☐ Fair
☑ Poor
☐ Not Categorized

ⓘ Sections below classify selected users across factors.
• Expand (>) the factor sections to see classification of users across subfactors
• Note that the user count at subfactor levels might not add up to the user count at factor level. For example, the users with high GPO execution times might not necessarily have poor logon duration \> Factors affecting UX

USER CLASSIFICATION BASED ON FACTORS ⓘ

∨ Session
Responsiveness ⓘ

230 USERS
Round trip time
(Less than 100 ms)

172 USERS
Round trip time
(100 – 300 ms)

593 USERS
Round trip time
(more than 300 ms)

5 USERS
Not Categorized
Learn more

| SUBFACTOR | USER DISTRIBUTION | EXCELLENT | FAIR | POOR | NOT CATEGORIZED |
|---|---|---|---|---|---|
| WanLatency | ▨▨▨▨▨ | 182 | 322 | 496 | 0 |
| DcLatency | ▨▨▨ | 543 | 238 | 219 | 0 |
| HostDelay | ▨▨ | 457 | 360 | 178 | 5 |

| Performance | Operations | | | | DataSources |
|---|---|---|---|---|---|
| | ∨ Session Duration ⓘ | 432 USERS Logon time (Less than 67.87 sec) | 20 USERS Logon time (67.87 – 120 sec) | 488 USERS Logon time (More than 120 sec) | 88 USERS Not Categorized Learn more |
| | ∨ Session Responsiveness ⓘ | 6 USERS Round trip time (Less than 100 ms) | 456 USERS Round trip time (100 – 300 ms) | 473 USERS Round trip time (more than 300 ms) | 65 USERS Not Categorized Learn more |

| SUBFACTOR | USER DISTRIBUTION | EXCELLENT | FAIR | POOR | NOT CATEGORIZED | INSIGHTS |
|---|---|---|---|---|---|---|
| WanLatency | ▬▬▬ | 800 | 129 | 71 | 0 | 71 users have high wanLatency Possible Reasons |
| | 25 out of 71 poor users are currently using ftl.agree.example.com causing high wanLatency. They are recommended to use: blr.agree.example.com. | | | | | |
| DcLatency | ▬▬▬ | 319 | 83 | 598 | 0 | 598 users have high dcLatency Possible Reasons |
| HostDelay | ▬▬▬ | 645 | 196 | 159 | 0 | |
| Session Resiliency ⓘ | 434 USERS Average reconnect rate (Less than 1 per 15 mins) | 75 USERS Average reconnect rate (1 per 15 mins) | | 396 USERS Average reconnect rate (More than 1 per 15 mins) | | 95 USERS Not Categorized Learn more |

| Performance | Operations | | | | | | |
|---|---|---|---|---|---|---|---|
| | ✓ Session Responsiveness ⓘ | 6 USERS Round trip time (Less than 100 ms) | 456 USERS Round trip time (100 – 300 ms) | 473 USERS Round trip time (more than 300 ms) | 65 USERS Not Categorized Learn more | DataSources | |
| | | SUBFACTOR | USER DISTRIBUTION | EXCELLENT | FAIR | POOR | NOT CATEGORIZED | INSIGHTS |
| | | WanLatency | ▭▭▭ | 800 | 129 | 71 | 0 | 71 users have high wanLatency Possible Reasons |
| | | 36 out of 71 poor users are currently using ftl.agree.example.com causing high wanLatency. They are recommended to use: blr.agree.example.com. | | | | | | |
| | | DcLatency | ▭▭ | 319 | 83 | 598 | 0 | 598 users have high dcLatency Possible Reasons |
| | | 575 out of 598 poor users are currently using sin.agree.example.com causing high dcLatency. They are recommended to use: blr.agree.example.com. 14 users with poor dcLatency also had 39 gateway to machine communication failures. | | | | | | |
| | | HostDelay | ▭▭ | 645 | 196 | 159 | 0 | |
| | Session Resiliency ⓘ | 434 USERS Average reconnect rate (Less than 1 per 15 mins) | 75 USERS Average reconnect rate (1 per 15 mins) | 396 USERS Average reconnect rate (More than 1 per 15 mins) | 95 USERS Not Categorized Learn more | | |

OPTIMIZING SELECTION OF GATEWAYS BASED ON LOCATION AND USER EXPERIENCE RELATED METRICS

FIELD OF THE DISCLOSURE

The present application generally relates to network communications. In particular, the present application relates to systems and methods for selecting gateways based on location and user experience related metrics.

BACKGROUND

An intermediary device may manage and handle communications between a client and a server. When a client sends a request to access resources hosted on a server, the intermediary device may receive and forward the request to the server. In turn, upon receipt and processing of the request, the server may send a response to return to the client via the intermediary device.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

Multiple gateways (also referred herein as proxies or intermediary devices) may facilitate communications between a multitude of clients of servers as part of a network environment (e.g., a virtual private network (VPN) or a software-defined network (SDN)). For instance, to access a virtualized application or desktop hosted on a server, an end user on a client may first login to the gateway. While accessing the application or desktop, the end user may notice sluggish or otherwise undesirable performance, and may notify an administrator of the network. One of the factors leading to the poor, slow performance may include relative distances among the clients, gateways, and servers, as these network entities may be geographically distributed in different locations.

Under one approach, the network administrator, once notified of the poor, sluggish performance, may view the performance metrics across various users on a performance analytics dashboard. The dashboard may be a graphical user interface presenting various performance metrics related to the communications among the clients, servers, and gateways through the designated network. The performance metrics may include, for example, session responsiveness (e.g., measured by round trip time ("rtt")), wide area network (WAN) latency ("wanLatency"), and data center (DC) latency ("dcLatency"), among others. These metrics may be impacted by the geographic location of the client, the gateway, and the server, since greater relative distances between these network entities may result in greater round trip times and latencies. But the system administrator may lack any insight or knowledge into the factors leading to the high latencies or round trip times from the performance analytics dashboard. Without resolution of the underlying circumstances contributing to the poor performance metrics, the user may continue to face poor, sluggish performance while accessing the virtualized applications or desktop hosted on the server.

To address these and other challenges, a performance analytics service may switch the client from one gateway to another gateway based on distance and user experience related metrics. The aim may be to leverage the measured performance metrics, and determine a correlation between the performance metrics with the locations of the client, gateway, and server. Using the correlation, the service may identify sub-optimal gateways that the users may be using and select an alternative gateway for communications between the client and the server. This may assist network administrators to triage and address network-related issues faster, and may enable the administrator to have an end-to-end look of the network path on the performance analytics dashboard.

The service may first identify end-users having a poor session experience as indicated by the session responsiveness (e.g., round trip time), WAN latency, or DC latency metrics, among others. The users may be categories into different groups based on session experience, such as excellent, fair, or poor experience. The session responsiveness may be dependent on WAN latency, DC latency, and delay at the server hosting the virtualized applications or desktop ("hostDelay"). Out of these, WAN latency and DC latency may be dependent on the geographic location of the user's client, gateway, and server. WAN latency may be the network delay between the client of the end-user and the gateway, and the greater the relative geographic distance between the client and the gateway, the greater the WAN latency may be. DC latency may be the network delay between the gateway and the server, and the greater the relative geographic distance between the gateway and the server, the greater the DC latency may be.

With the identification of the users with poor session experience, the service may identify which users are having issues due to the relative distances between the client and gateway and between the gateway and server for sessions of the users. The service may determine the distances based on information on the locations of these network entities. For example, the service may rely on a domain name (e.g., a fully qualified domain name (FQDN)) or a network address (e.g., Internet Protocol (IP) address) to determine the location of gateways available to the user. The service may use the network addresses to determine the locations of the client and server. Based on the locations of the network entities, the service may calculate the relative distances between the client and gateway and between the gateway and server. When the poor session experience is due to the WAN latency, the service may select an alternative gateway based on the distance between the client and the gateway. When the poor experience is due to the DC latency, the service may select an alternative gateway based on the distance between the gateway and the server.

From the perspective of the network administrator, the service may provide various insights on the performance of the network elements. First, the service may also provide for faster triage. In case a user provides a notification of the sluggish performance, the network administrator may be able to quickly deduce from the performance analytics dashboard to confirm whether the user is indeed having a poor experience and then correlate whether the poor experience is due to the gateway. Second, the service may provide for proactive insights. When the user has not yet raised any issues of sluggish performance, the network administrator can still examine the dashboard to check whether any users have poor session experience and whether the poor experience is due to a sub-optimal selection of the gateway. Third, the service may also provide a holistic view of the network path. The service may allow for drilldown capabilities and add another layer of insights on the performance and the causes of poor session experience.

In this manner, the performance analytics service may leverage measured performance metrics on the network elements, and may automatically re-route users with poor session experiences to a better performing gateway of available. The service may not only prevent poor session experience as a user initiates a session with the network, but also take proactive corrective measures before the user notices any degradation in performance.

Aspects of the present disclosure are directed to methods, systems, and non-transitory computer readable media for selecting a device via which to access a server. A service having one or more processors coupled with memory may detect a measure of experience for a client device in accessing a server via a first device being below a threshold. The service may identify, responsive to the detection, a plurality of devices available for the client device to access the server. The service may determine a distance between each of the plurality of devices and at least one of the client device or the server. The service may select a second device from the plurality of devices via which the client device is to access the server based at least on the distance between the second device and at least one of the client device or the server.

In some embodiments, the service may identify at least one of a latency between the first device and the server or a latency between the client device and the first device, as below the threshold. In some embodiments, the service may determine the distance between each of the plurality of devices and the server, responsive to identifying a latency between the first device and the server as below the threshold. In some embodiments, the service may determine the distance between each of the plurality of devices and the server, responsive to identifying a latency between the client device and the first device as below the threshold.

In some embodiments, the service may identify the plurality of devices with which the client device was previously connected, responsive to a latency between the client and the first device being below the threshold. In some embodiments, the service may identify the plurality of devices with which the server was previously connected, responsive to a latency between the first device and the server being below the threshold In some embodiments, the service may identify, using a previously establish session, a location of at least one of the first device, the client device, or at least one of the devices. In some embodiments, the service may provide information on the measure of experience for the client device in accessing the server via the first device and the distance between each of the plurality of devices and at least one of the client device or the server.

In some embodiments, the service may determine, responsive to the first device matching the second device selected from the plurality of devices, that the first device is to be continued for use by the client device in accessing the server. In some embodiments, the service may determine, responsive to the first device not matching the second device selected from the plurality of devices, that a distance between the first device and at least one of the client device and the server is a cause of the measure of experience being below the threshold.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 8:
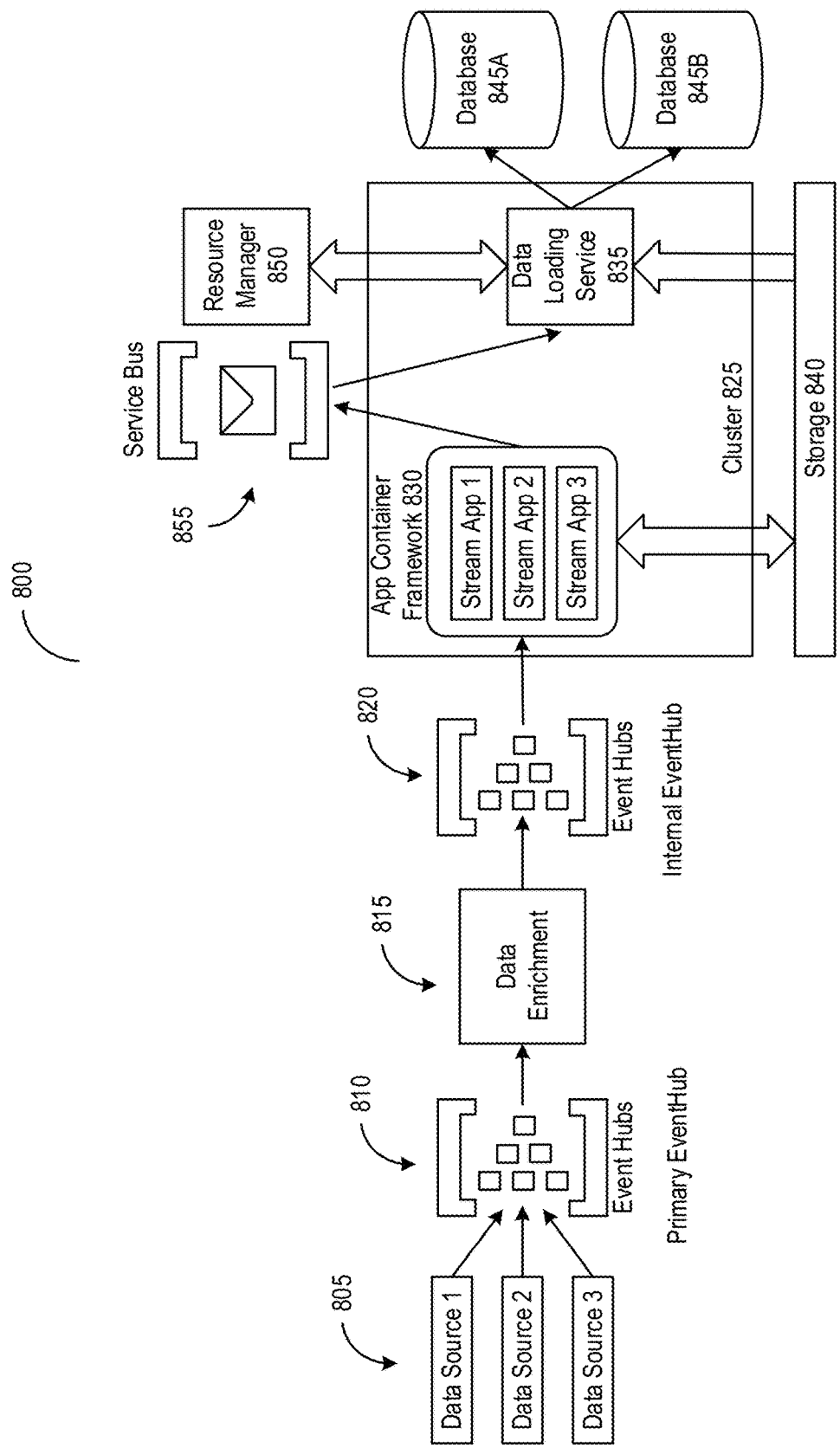
Figure 9:
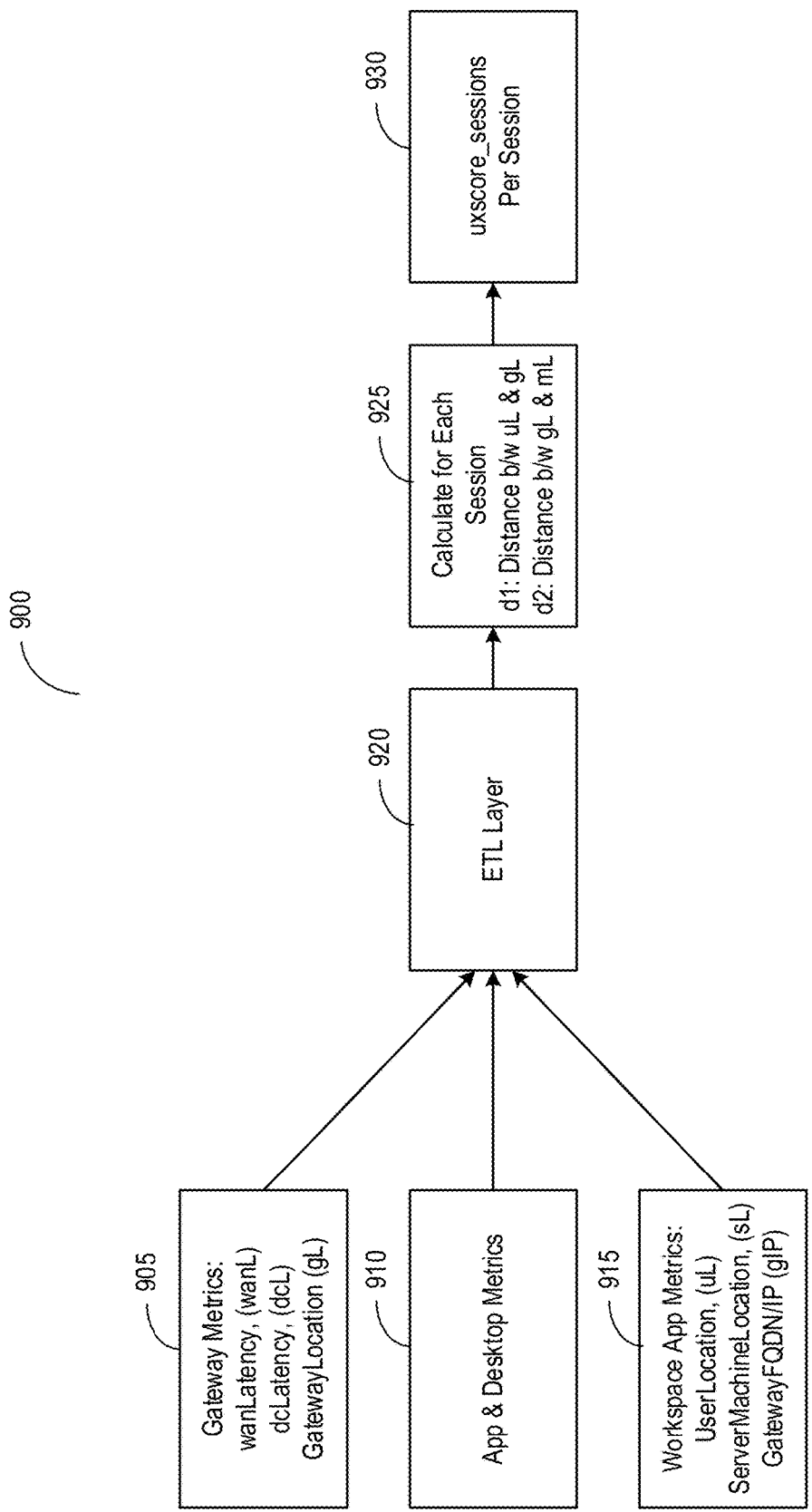
Figure 10A:
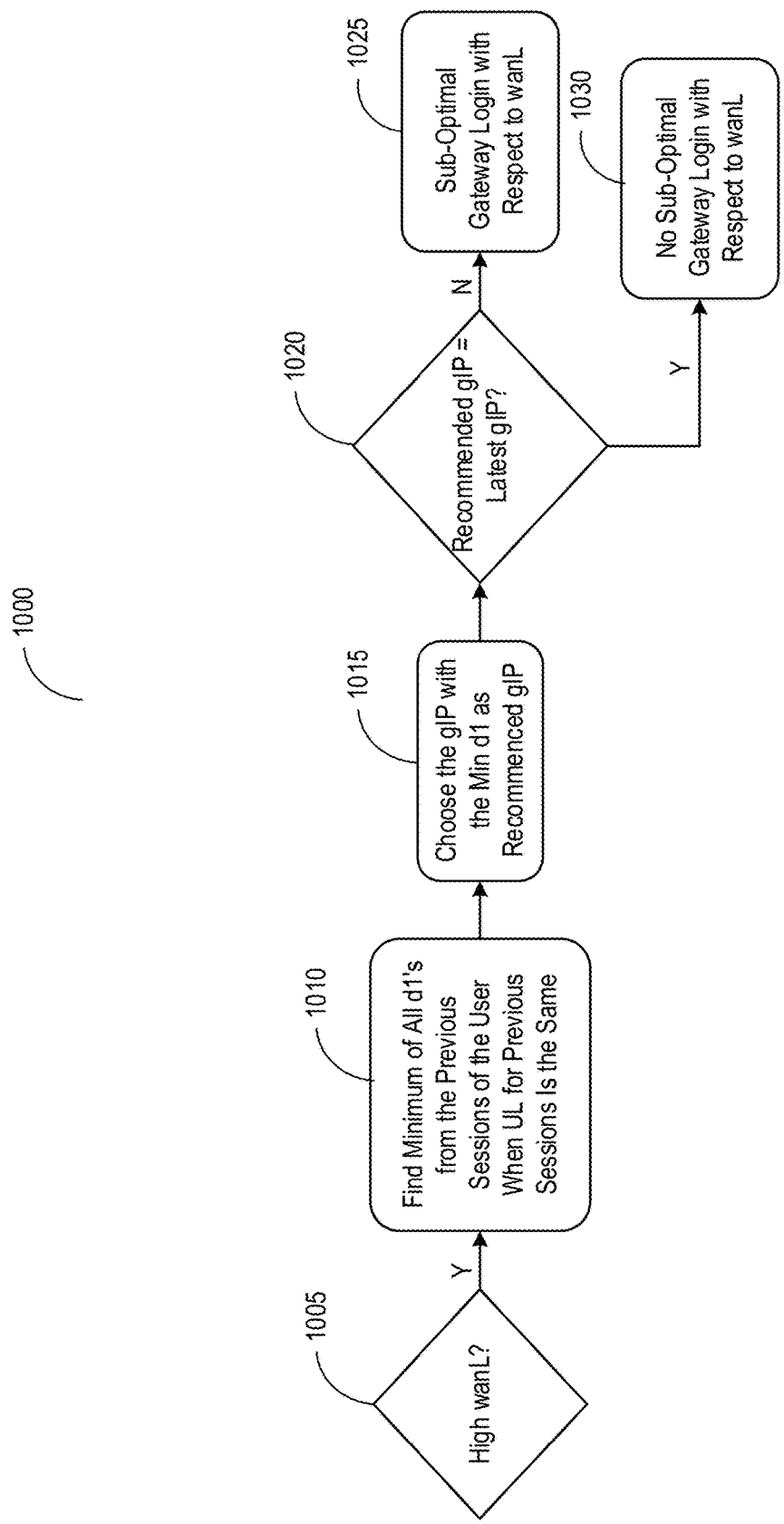
Figure 10B:
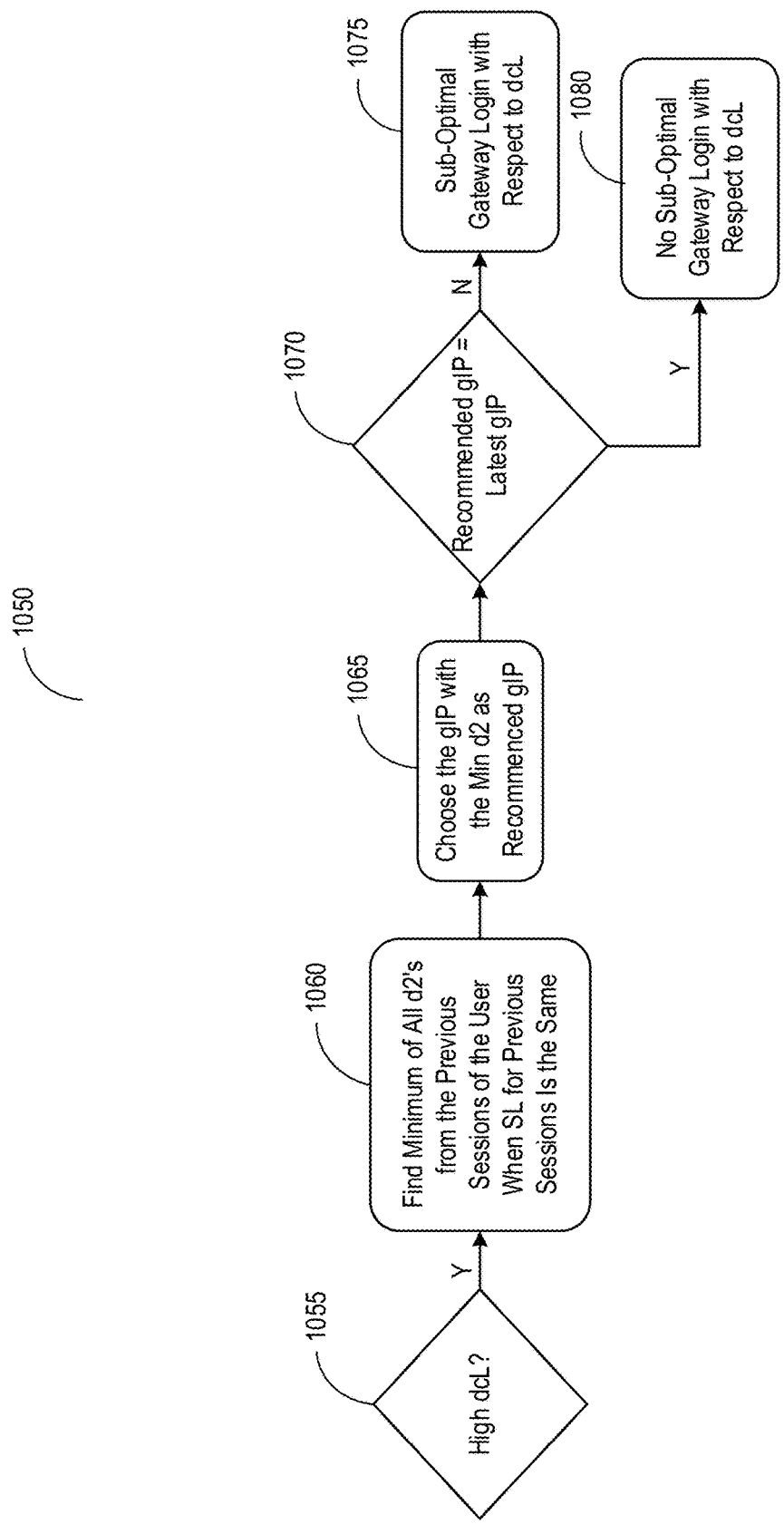
Figure 11:
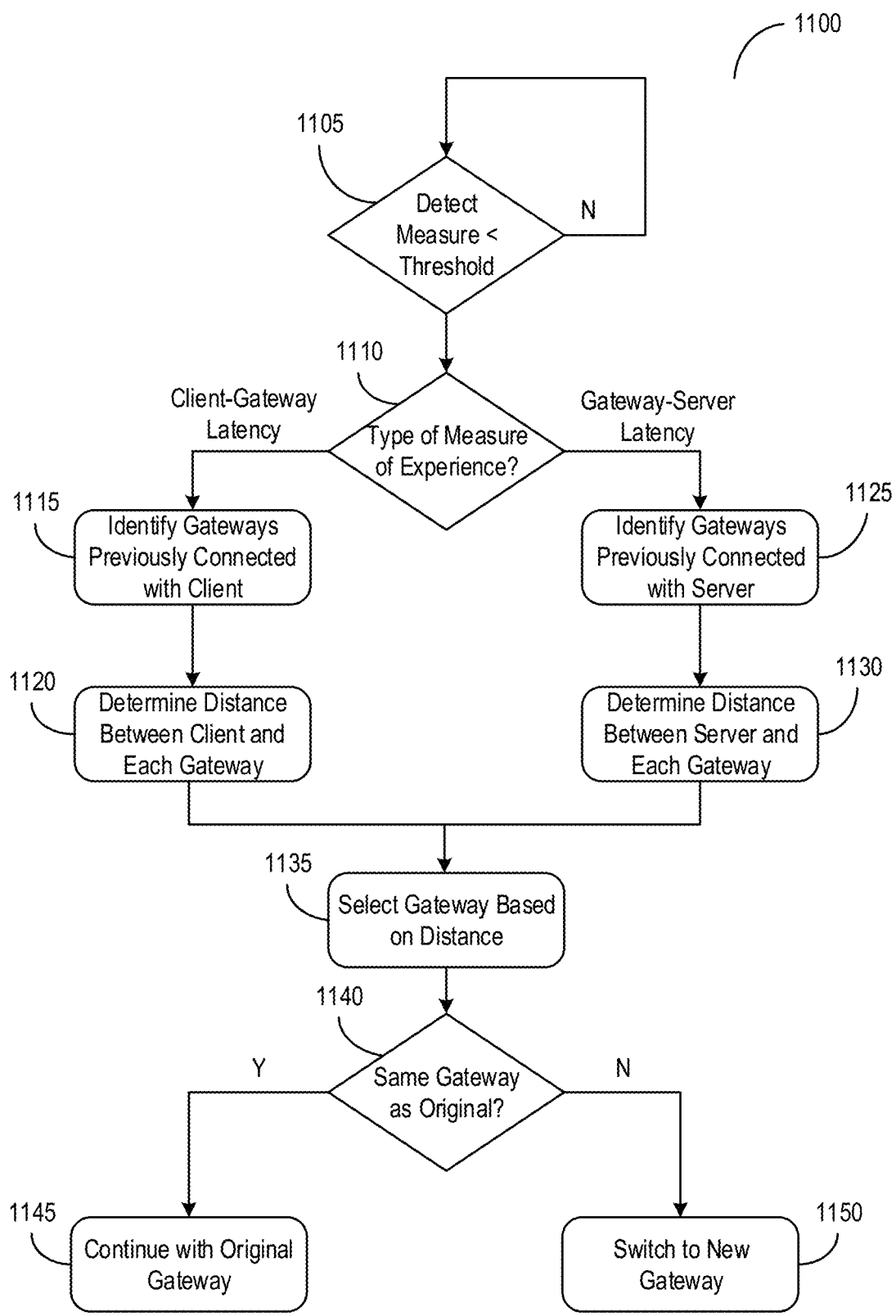

FIGS. 7A-D are screenshots of embodiments of user interfaces for presenting performance analytics in the system for selecting gateways in accordance with an illustrative embodiment;

FIG. 8 is a block diagram of an embodiment of an architecture for aggregating performance analytics in accordance with an illustrative embodiment;

FIG. 9 is a flow diagram of an embodiment of a method for aggregating measures of session experience in accordance with an illustrative embodiment;

FIG. 10A is a flow diagram of an embodiment of a method for selecting gateways using wide area network (WAN) latency as a measure of session experience in accordance with an illustrative embodiment;

FIG. 10B is a flow diagram of an embodiment of a method for selecting gateways using data center (DC) latency as a measure of session experience in accordance with an illustrative embodiment; and FIG. 11 is a flow diagram of an embodiment of a method of selecting gateways based on location and user experience related metrics in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for selecting gateways based on location and user experience related metrics.

A. Network and Computing Environment

Figure 1A:
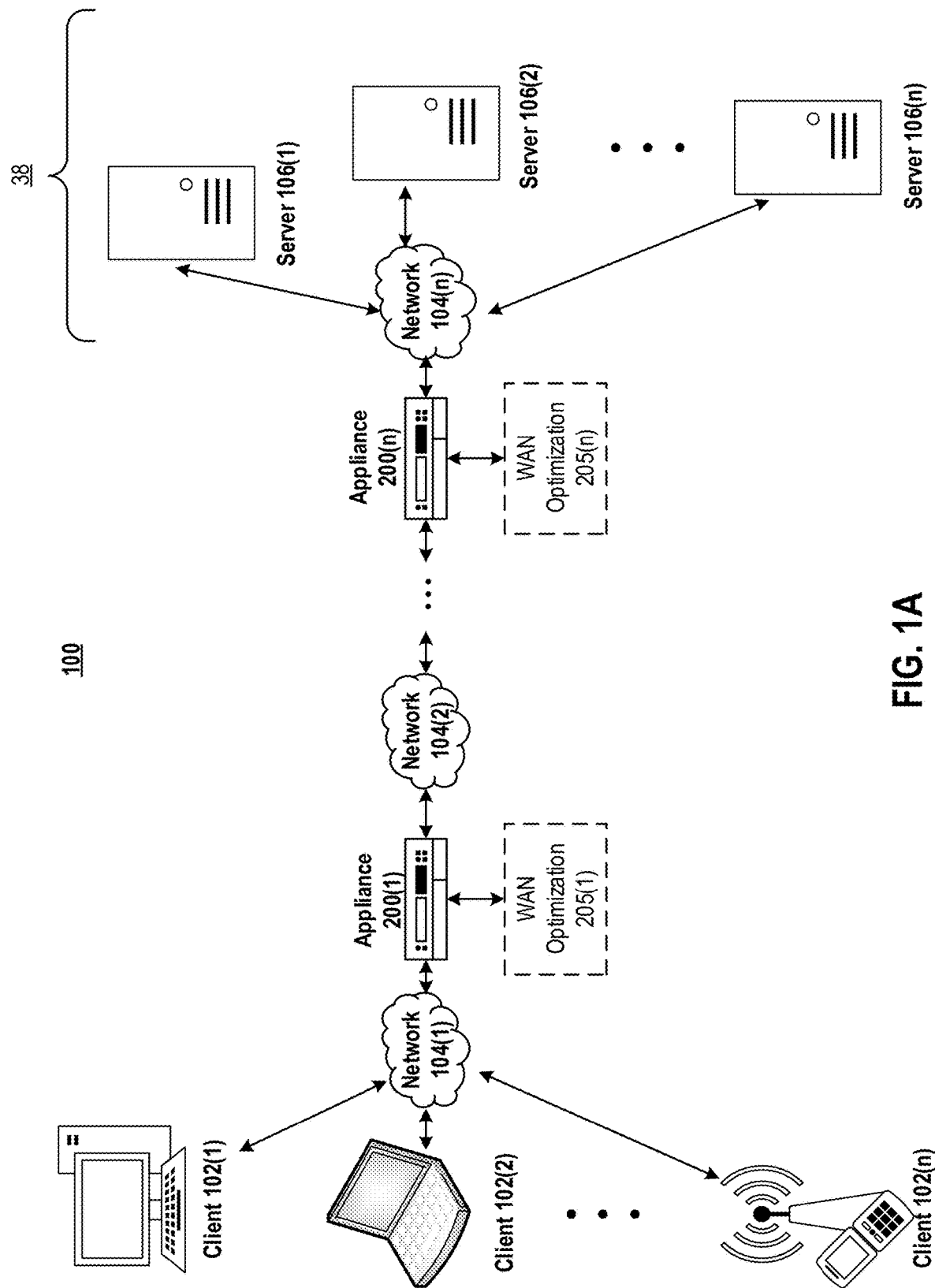
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
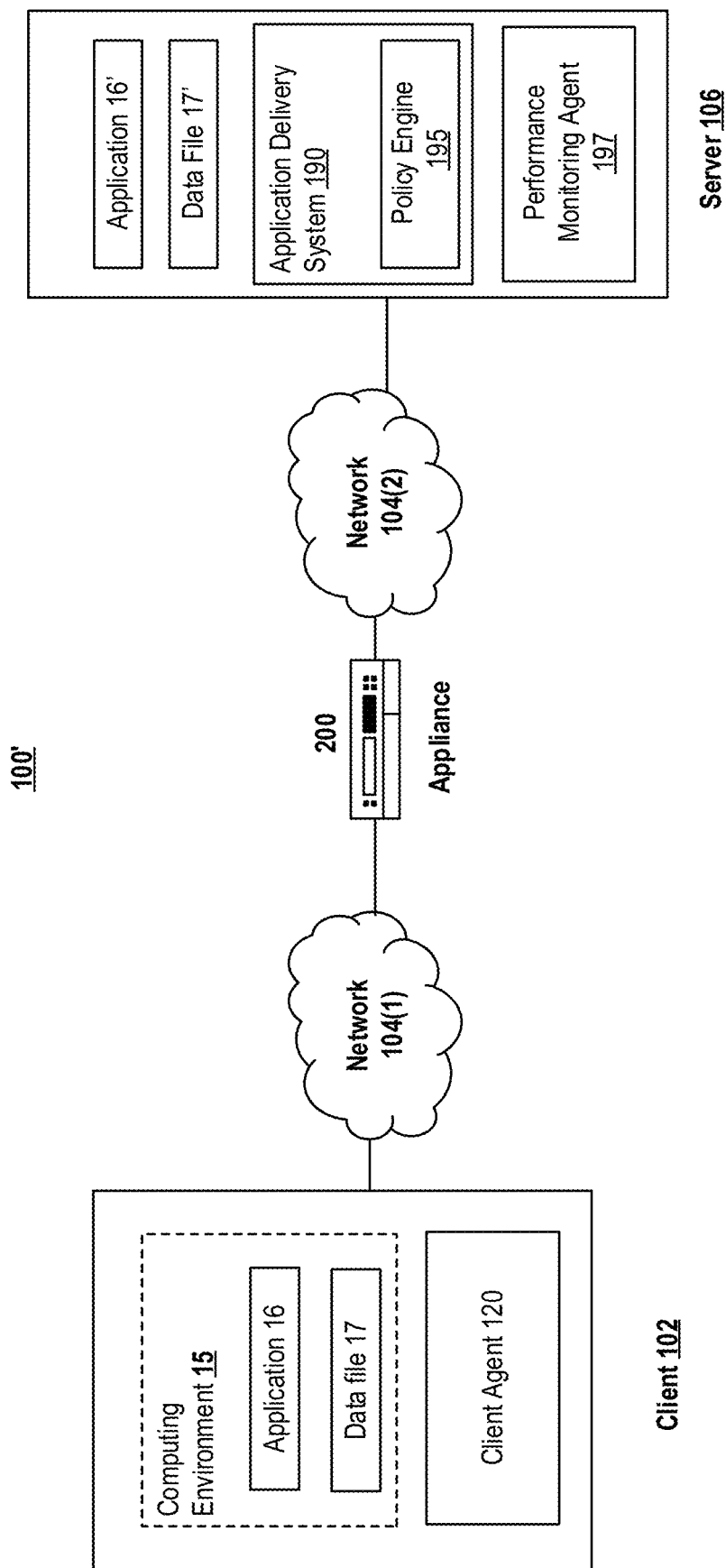
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
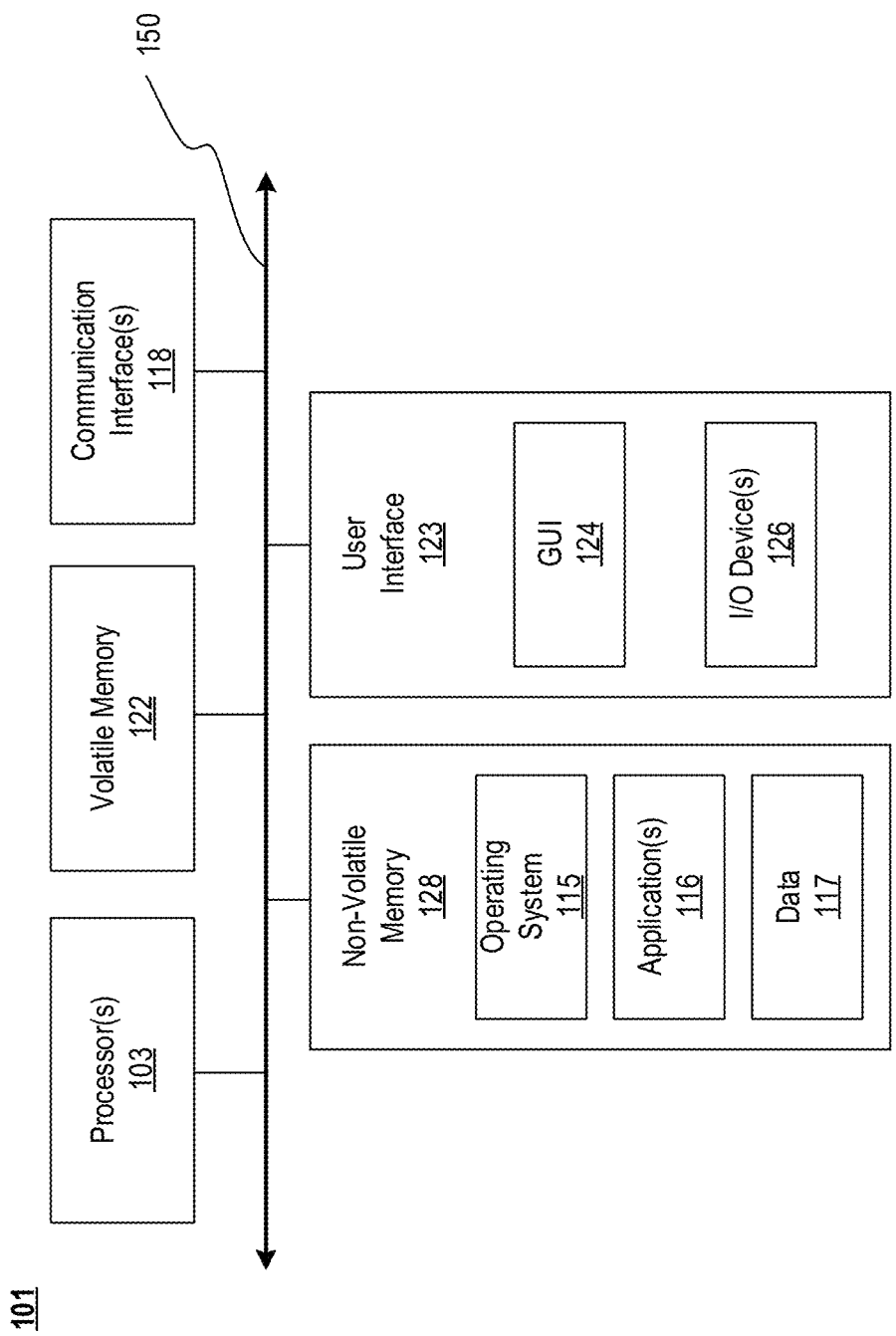
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
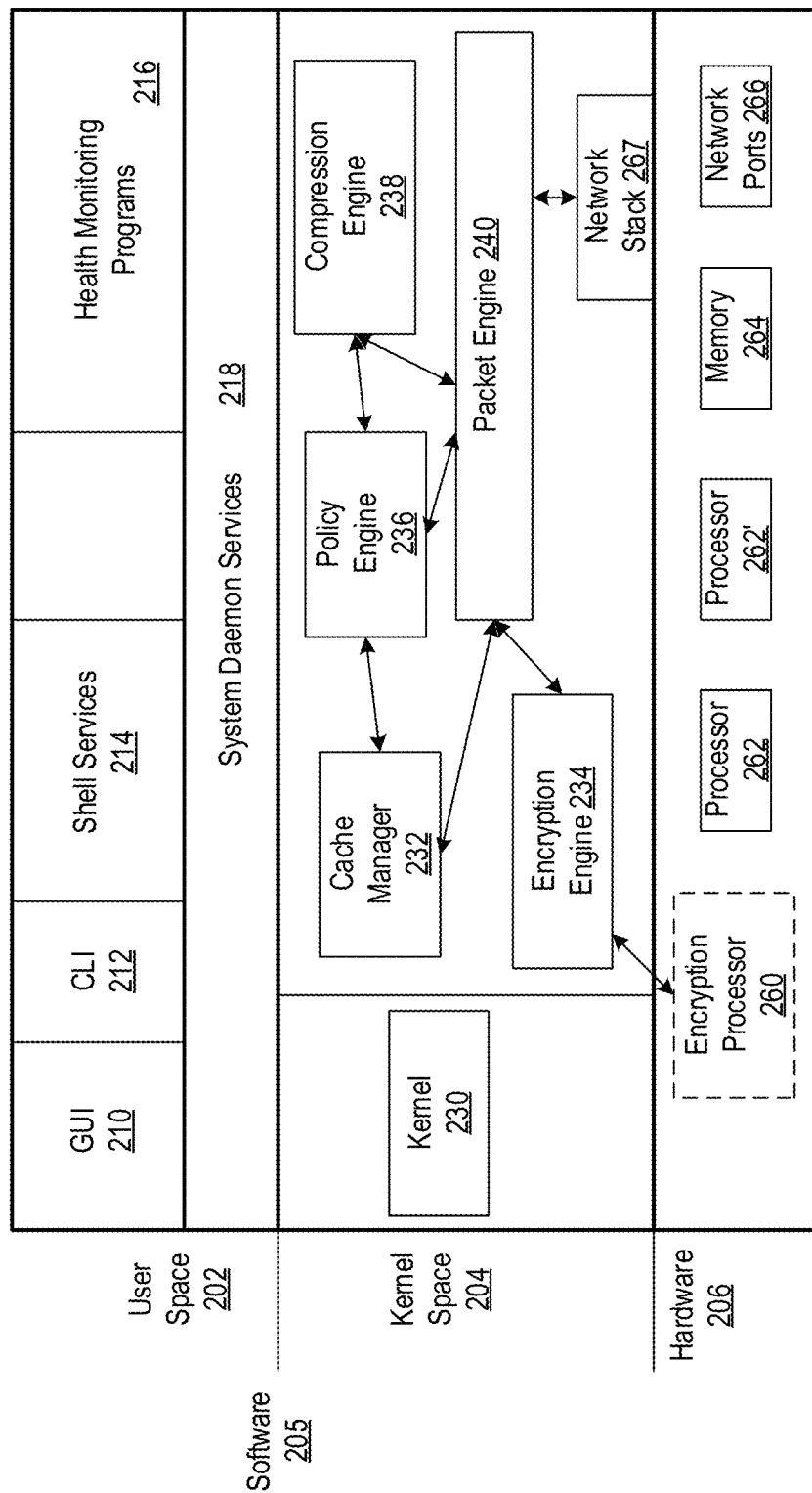
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processors 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
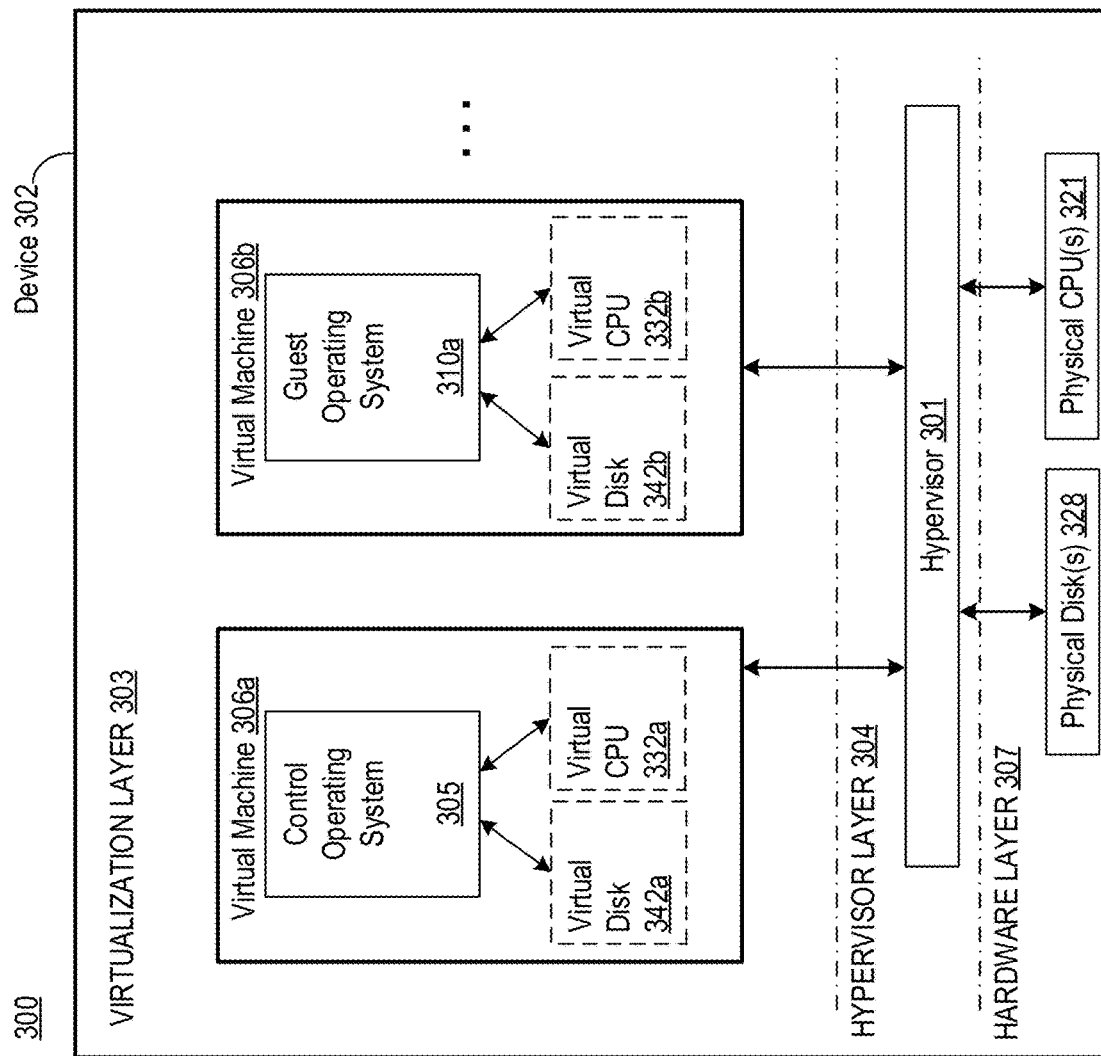
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
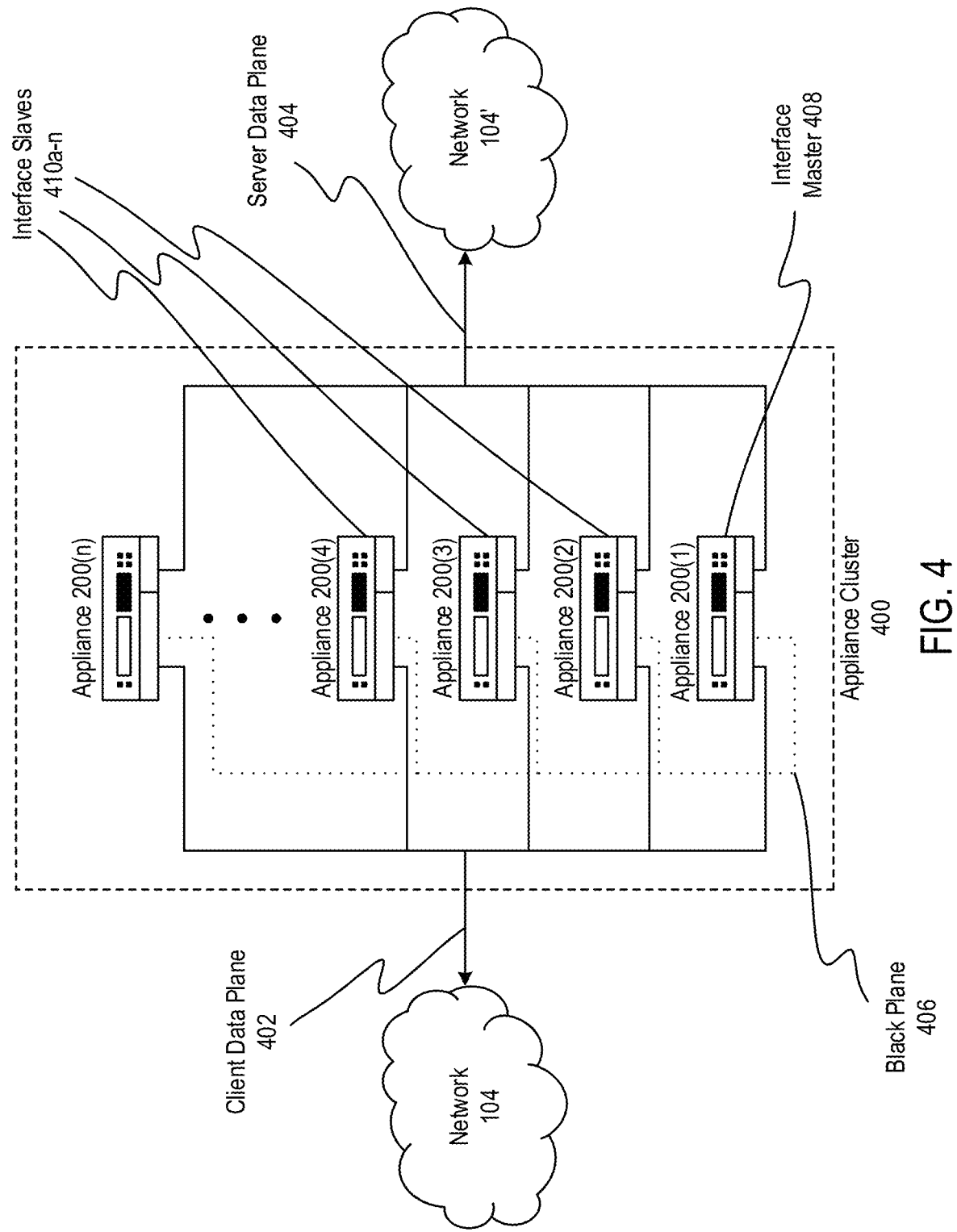
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Figure 5:
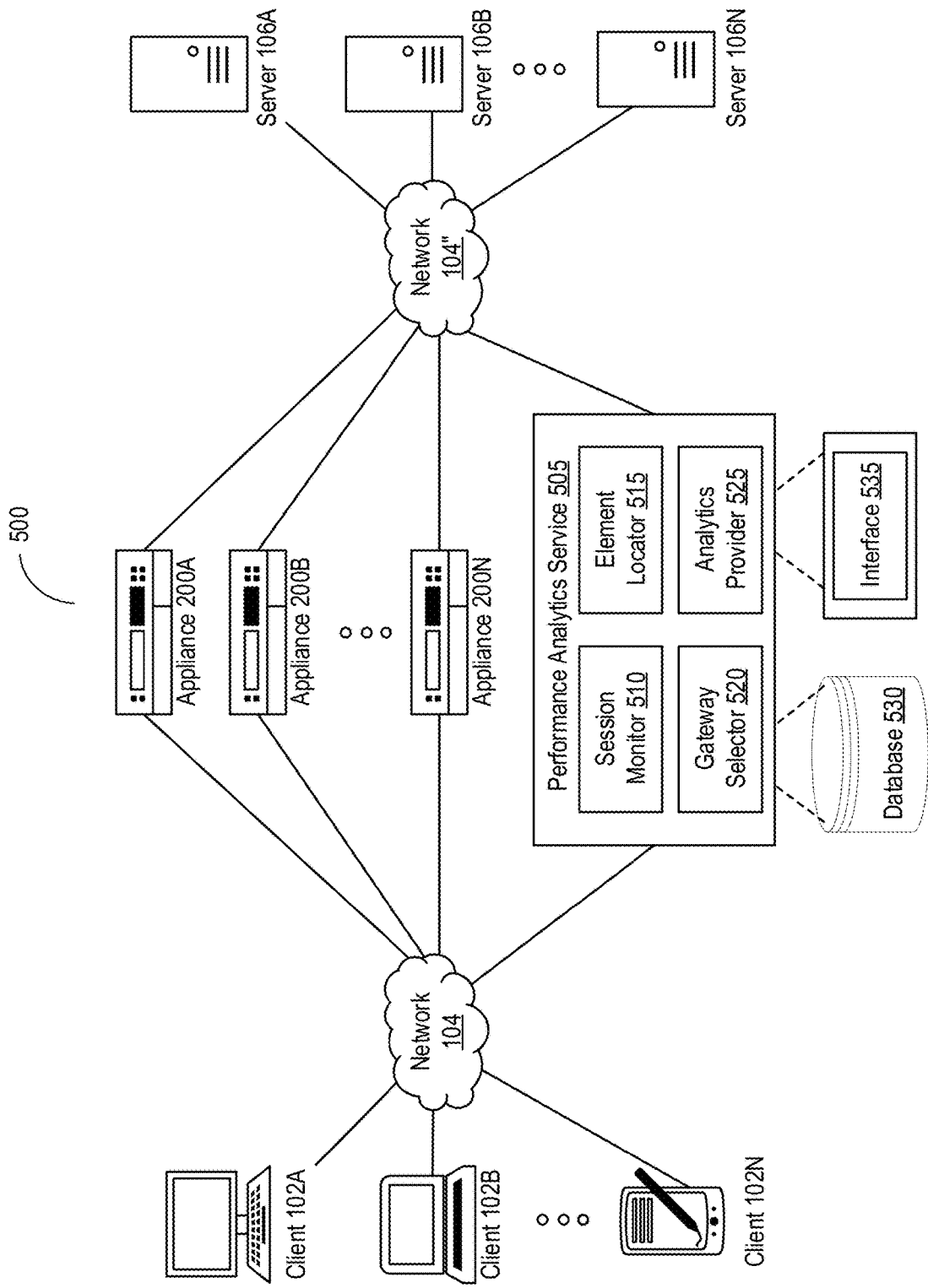
FIG. 5 is a block diagram of an embodiment of a system for selecting gateways based on location and user experience related metrics in accordance with an illustrative embodiment.

E. Systems and Methods for Selecting Gateways Based on Location and User Experience Related Metrics Referring now to FIG. 5, depicted is a block diagram of a system 500 for selecting gateways based on location and user experience related metrics. In overview, the system 500 may include one or more clients 102a-n (hereinafter generally referred to as clients 102), one or more servers 106a-n (hereinafter generally referred to as servers 106), a set of appliances 200A-N (hereinafter generally referred to as appliances, proxies, intermediary devices, or generally as devices) deployed between the clients 102 and the servers 106, and at least one performance analytics service 505 (sometimes referred herein generally as a service), among others. The clients 102, the set of appliances 200, and the performance analytics system 505 may be communicatively coupled with one another via at least one network 104. The set of appliances 200, the performance analytics system 505, and the servers 106 may be communicatively coupled with one another via at least one network 104'. The performance analytics system 505 may include at least one session monitor 510, at least one element locator 515, at least one gateway selector 520, at least one analytics provider 525, at least one database 530, among others, and may provide at least one interface 535, among others. In some embodiments, the performance analytics service 505 may be on at least one network element or device separate from the set of appliances 200. In some embodiments, an instance of the performance analytics service 505 may be a part of at least one of the appliances 200.

The systems and methods of the present solution may be implemented in any type and form of device, including clients, servers and/or appliances 200. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

Figure 6A:
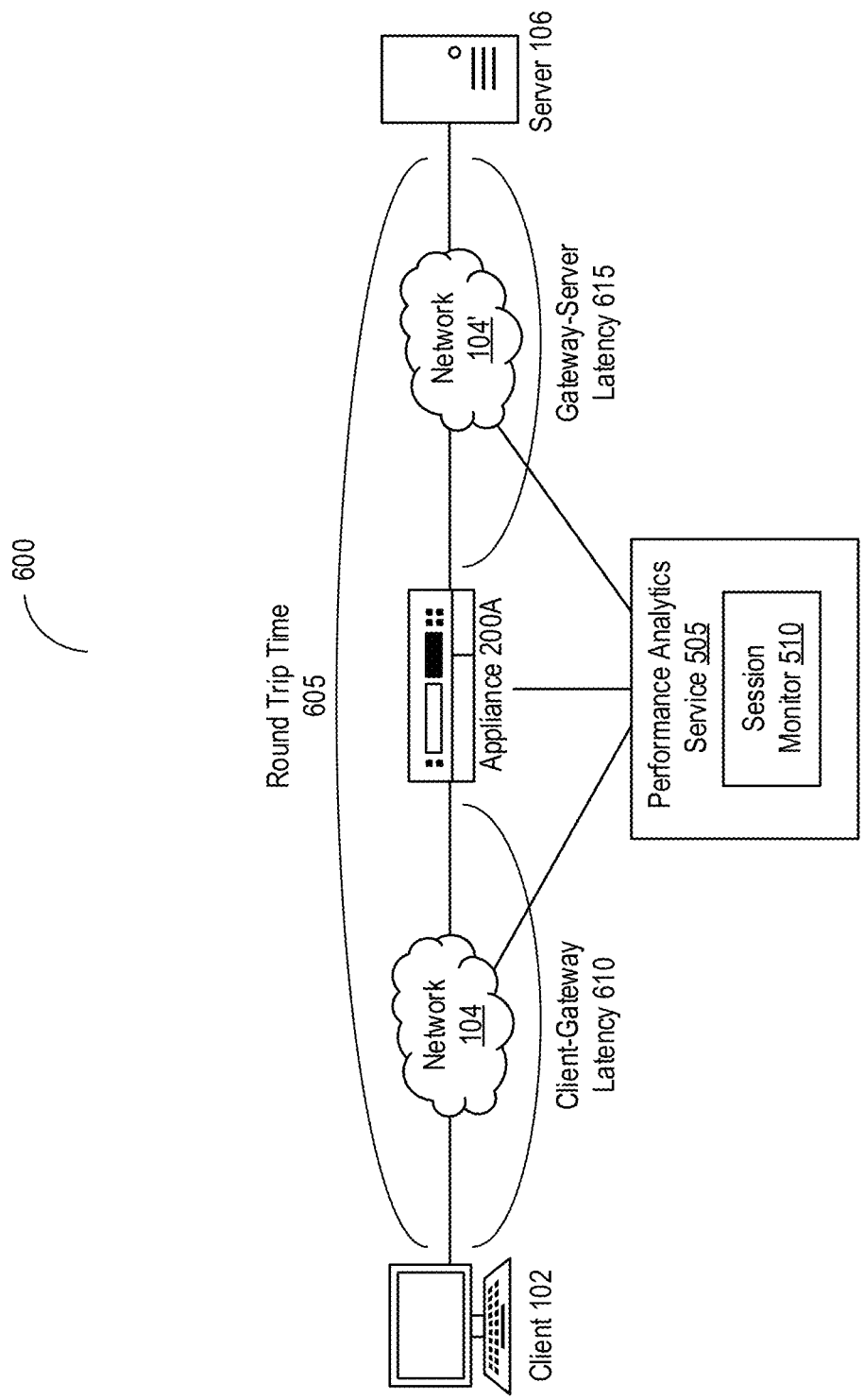
FIG. 6A is a block diagram of an embodiment of a process for detecting measures of session experience in the system for selecting gateways in accordance with an illustrative embodiment.

Referring now to FIG. 6A, depicted is a block diagram of a process 600 for detecting measures of session experience in the system 500 for selecting gateways. Under the process 600, the client 102 may be accessing resources hosted on at least one of the servers 106 via the appliance 200A (sometimes herein referred to as the initial appliance 200A). The resources may include, for example, one or more virtualized applications, a desktop, or other data hosted on the server 106. In accessing, the client 102 and the server 106 may initiate and establish at least one session over the appliance 200A. In some embodiments, the client 102 and the appliance 200A may establish at least one session over the network 104 and the appliance 200A (on behalf of the client 102) and the server 106 may establish at least one session over network 104'. While accessing the resources hosted on the server 106, the end-user of the client 102 may experience varying levels of performance. For instance, the user may face slow response times while attempting to use a function on a virtualized application hosted on the server 106. In certain cases, the poor response times may be due to the geographic distance among the client 102, the server 106, and the appliance 200A. In some embodiments, the client 102 may physically reside in a branch office, enterprise network, or home office and the server 106 may reside at a data center.

In conjunction, the session monitor 510 executing on the performance analytics service 505 may collect, identify, or otherwise obtain at least one measure of experience for the client 102 in accessing the server 106 via the appliance 200A. In some embodiments, the session monitor 510 may obtain the measure of experience in accordance with a schedule. For example, the schedule may specify that the session monitor 510 is to sample the measures across the clients 102 at an interval ranging between 10 minutes to an hour. The measure may include or may be one or more performance metrics affecting the experience of the user of the client 102 in accessing the server 106, such a responsiveness of the overall session. The measure of experience in general may include those performance metrics dependent on relative geographic distances among the client 102, the server 106, and the appliance 200A. The measure of experience instrumented by the session monitor 510 may include, for example, a round trip time 605, a client-gateway latency 610, and a gateway-server latency 615, among others. In some embodiments, the measure of experience may be a score based on the round trip time 605, the client-gateway latency 610, or the gateway-server latency 615, or any combination thereof The round trip time 605 may correspond to an amount of time for a message to be sent from one end (e.g., the client 102) to the other end (e.g., the server 106) via the appliance 200A and a response to the message sent from the recipient end (e.g., the server 106) and sender end (e.g., the client 102). To measure the round trip time 605, the session monitor 510 may identify a time at which a message is sent by the client 102 to the server 106 and a time at which a response is received by the client 102 from the server 106 during the session. Conversely, the session monitor 510 may identify a time at which a message is sent by the server 106 to the client 102 and a time at which a response is received by the server 106 from the client 102. In either case, the session monitor 510 may calculate a difference in the time at which the message is sent and the time at which response is received to use as the round trip time 605.

The client-gateway latency 610 (sometimes referred herein as wide area network (WAN) latency (wanL)) may correspond to an amount of time a message takes to be communicated or propagated between the client 102 and the appliance 200A in either direction. To measure the client-gateway latency 610, the session monitor 510 may identify a time at which a message is transmitted by the client 102 and a time at which the same message is received at the appliance 200A during the session. Conversely, the session monitor 510 may identify a time at which a message is transmitted by the appliance 200A and a time at which the same message is received at the client 102 during the session. In either case, the session monitor 510 may calculate a difference in the time at which the message is sent and the time at which response is received to use as the client-gateway latency 610.

The gateway-server latency 615 (sometimes referred herein as data center (DC) latency (dcL)) may correspond to an amount of time a message takes to be communicated or propagated between the appliance 200A and the server 106 in either direction. To measure the gateway-server latency 615, the session monitor 510 may identify a time at which a message is transmitted by the appliance 200A and a time at which the same message is received at the server 106 during the session. Conversely, the session monitor 510 may identify a time at which a message is transmitted by the server 106 and a time at which the same message is received at the appliance 200A during the session. In either case, the session monitor 510 may calculate a difference in the time at which the message is sent and the time at which response is received to use as the gateway-server latency 615.

With the obtaining of the measure, the session monitor 510 may identify, determine, or detect whether the measure of experience satisfies a threshold. The threshold may delineate, mark, or otherwise identify a value for the measure at which the end user of the client 102 is determined to have satisfactory or unsatisfactory experience with the session between the client 102 itself and the server 106 via the appliance 200A. The threshold may be different for each type of measure of experience, such as the round trip time 605, the client-gateway latency 610, and the gateway-server latency 615, among others. In some embodiments, the session monitor 510 may perform the determination as to whether the measure of experience satisfies the threshold in accordance with a schedule. For example, the schedule may specify that the session monitor 510 is to perform the determination for each client 102 at an interval ranging between 10 minutes to an hour.

For each type of measure of experience, the session monitor 510 may compare the measure with the threshold. When the measure of experiences satisfies (e.g., greater than or equal to) the threshold, the session monitor 510 may identify or determine that the user of the client 102 has satisfactory experience. The session monitor 510 may continue monitoring the measure of experience of the user at the client 102, and the session between the client 102 and the server 106 over the appliance 200A may be permitted to continue.

In contrast, when the measure of experience does not satisfy (e.g., less than) the threshold, the session monitor 510 may identify or determine that the user of the client 102 does not have the satisfactory experience. In some embodiments, the session monitor 510 may first determine that the round trip time 605 does not satisfy the threshold, and then compare the client-gateway latency 610 or the gateway-server latency 615 to the respective threshold. In some embodiments, the session monitor 510 may identify the type of measure (e.g., the client-gateway latency 610 and the gateway-server latency 615) corresponding to the measure not satisfying the threshold. Furthermore, the performance analytics service 505 may initiate additional evaluation of the session through the appliance 200A.

Figure 6B:
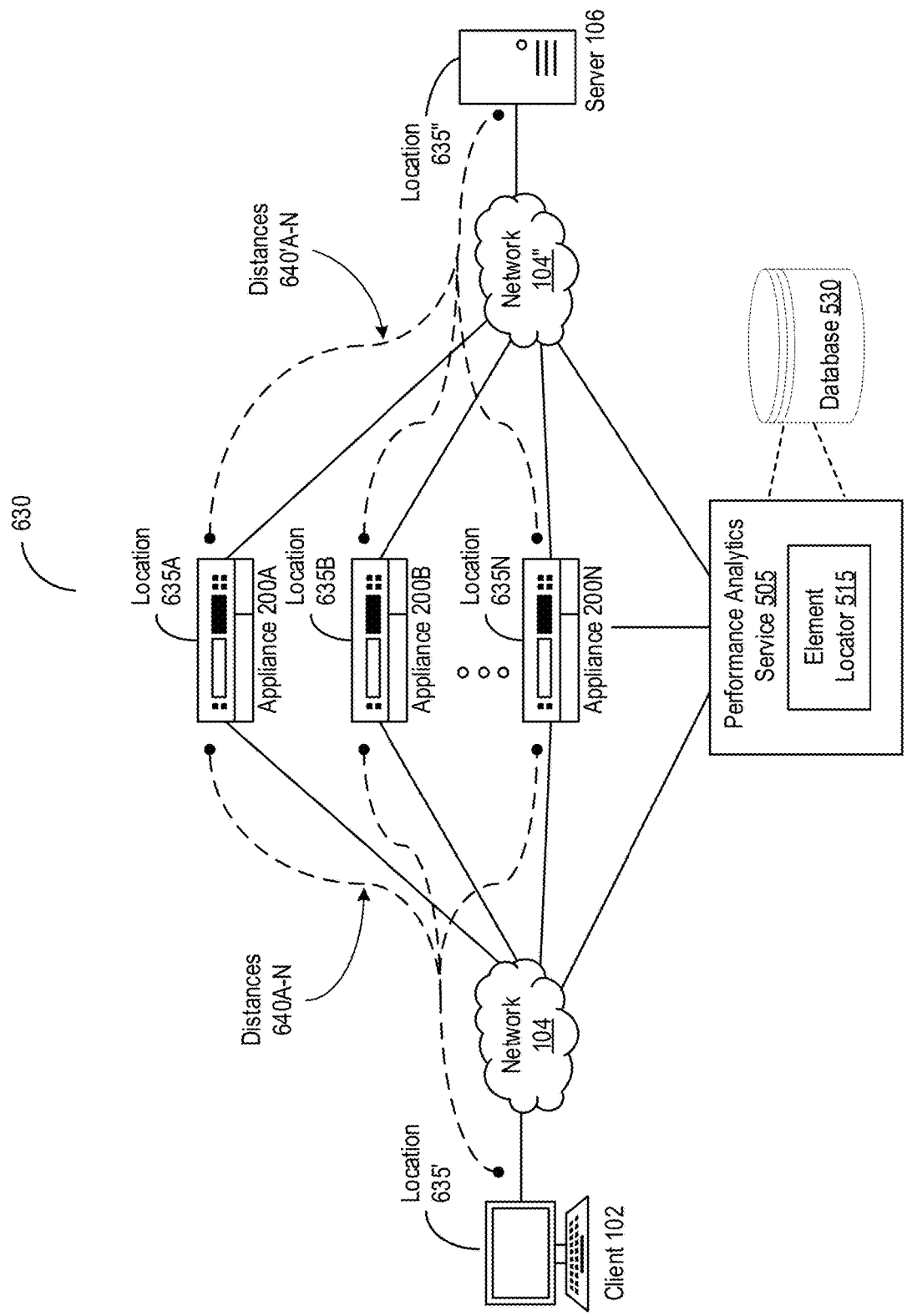
FIG. 6B is a block diagram of an embodiment of a process for determining distances of network elements in the system for selecting gateways in accordance with an illustrative embodiment.

Referring now to FIG. 6B, depicted is a block diagram of a process 620 for determining distances of network elements in the system 500 for selecting gateways. The process 620 may performed by the performance analytics service 505 when the user of the client 102 is determined to not have a satisfactory experience with the session. Under the process 620, the element locator 515 executing on the performance analytics service 505 may find or identify the set of appliances 200 available to the client 102 for accessing the server 106. The identified set of appliances 200 may include the appliance 200A, to which the client 102 is initially connected as discussed above. In some embodiments, the identification of the set of appliances 200 by the element locator 515 may be based on the type of measure of experience that did not satisfy the threshold. When the type of measure is the client-gateway latency 610, the element locator 515 may identify the set of appliances 200 previously used by the client 102 to connect. On the other hand, when the type of measure is gateway-server latency 615, the element locator 515 may identify the set of appliances 200 previously used by the server 106 to connect. The set of appliances 200 to which the client 102 or the server 106 connected in a previously established session may be kept track in the database 530 by the performance analytics service 505. In identifying, the element locator 515 may access the database 530 maintaining a record of the previously established sessions to find the set of appliances 200.

For each identified appliance 200, the element locator 515 may determine, find, or otherwise identify a location 635A-N (hereinafter generally referred to as location 635) of the appliance 200. The location 635 may correspond to a geographic position (e.g., in terms of longitude and latitude or mail address) of the corresponding appliance 200. To identify the location 635, in some embodiments, the element locator 515 may retrieve or identify a domain name (e.g., a fully qualified domain name (FQDN)) of each appliance 200.

Using the domain name of each appliance 200, the element locator 515 may retrieve or identify network address of (e.g., an Internet Protocol (IP) address or media access control (MAC) address of the appliance 200. For example, the element locator 515 may send a request to resolve a domain name system (DNS) server using the domain name of the appliance 200. The DNS server may return the network address of the appliance 200 to the element locator 515. With the identification, the element locator 515 may retrieve or identify the location 635 corresponding to the network address of the appliance 200. For instance, the element locator 515 may query a database mapping IP addresses to geographic locations using the network address of the appliance 200 to retrieve the location 635.

In some embodiments, the element locator 515 may retrieve or identify the network address for each appliance 200 from a previously established session. The previously established session may have been between the appliance 200 and the client 102, when the type of measure not satisfying the threshold is the client-gateway latency 610. Conversely, the previously established session may have been between the appliance 200 and the server 106, when the type of measure not satisfying the threshold is the gateway-server latency 615. With the identification, the element locator 515 may retrieve or identify the location 635 corresponding to the network address of the appliance 200 (e.g., in a similar manner as described above).

In addition, the element locator 515 may retrieve or identify network addresses (e.g., IP address or MAC address) of the client 102 or the server 106. In some embodiments, the element locator 515 may access the database 530 maintaining a record of the previously established sessions to identify the network addresses of the client 102 or the server 106. When the type of measure not satisfying the threshold is the client-gateway latency 610, the element locator 515 may identify the network address of the client 102. Otherwise, when the type of measure not satisfying the threshold is the gateway-server latency 615, the element locator 515 may identify the network address of the server 106. The network addresses may be particular to the networks 104 or 104' (e.g., virtual private networks). To obtain the public network addresses, the element locator 515 may apply network address translation (NAT) to the identified network addresses for the client 102 and the server 106.

With the identifications, the element locator 515 may retrieve or identify the location 635' corresponding to the network address of the client 102. The element locator 515 may also retrieve or identify the location 635" corresponding to the network address of the server 106. For instance, the locations 635' and 635" may be retrieved by the element locator 515 from the database mapping the IP addresses to the geographic locations. The location 635' may correspond to a geographic position (e.g., in terms of longitude and latitude or mail address) of the corresponding client 102. In some embodiments, the element locator 515 may store and maintain the location 635' of the client 102 on the database 530. The location 635" may corresponding to a geographic position of the corresponding server 106. In some embodiments, the element locator 515 may store and maintain the location 635 of the client 102 on the database 530. In some embodiments, the element locator 515 may store and maintain the location 635" of the server 106 on the database 530.

The element locator 515 may identify, calculate, or otherwise determine a distance 640A-N (generally referred herein after as distance 640) between the client 102 and each appliance 200. The determination of the distance 640 by the element locator 515 may be performed when the type of measure not satisfying the threshold is the client-gateway latency 610. The distance 640 between each appliance 200 and the client 102 may correspond to a length between the location 635 of the appliance 200 and the location 635' of the client 102. The distance 640 may be, for example, in terms of graph distance, Euclidean distance, and geodesic distance, among others. The element locator 515 may use the location 635 of each appliance 200 and location 635' of the client 102 in determining the distance 640.

In addition, the element locator 515 may identify, calculate, or otherwise determine a distance 640'A-N (generally referred herein after as distance 640') between the server 106 and each appliance 200. The determination of the distance 640' by the element locator 515 may be performed when the type of measure not satisfying the threshold is the client-gateway latency 610. The distance 640' between each appliance 200 and the server 106 may correspond to a length between the location 635 of the appliance 200 and the location 635" of the server 106. The distance 640' may be, for example, in terms of graph distance, Euclidean distance, and geodesic distance, among others. The element locator 515 may use the location 635 of each appliance 200 and location 635" of the server 106 in determining the distance 640'.

Figure 6C:
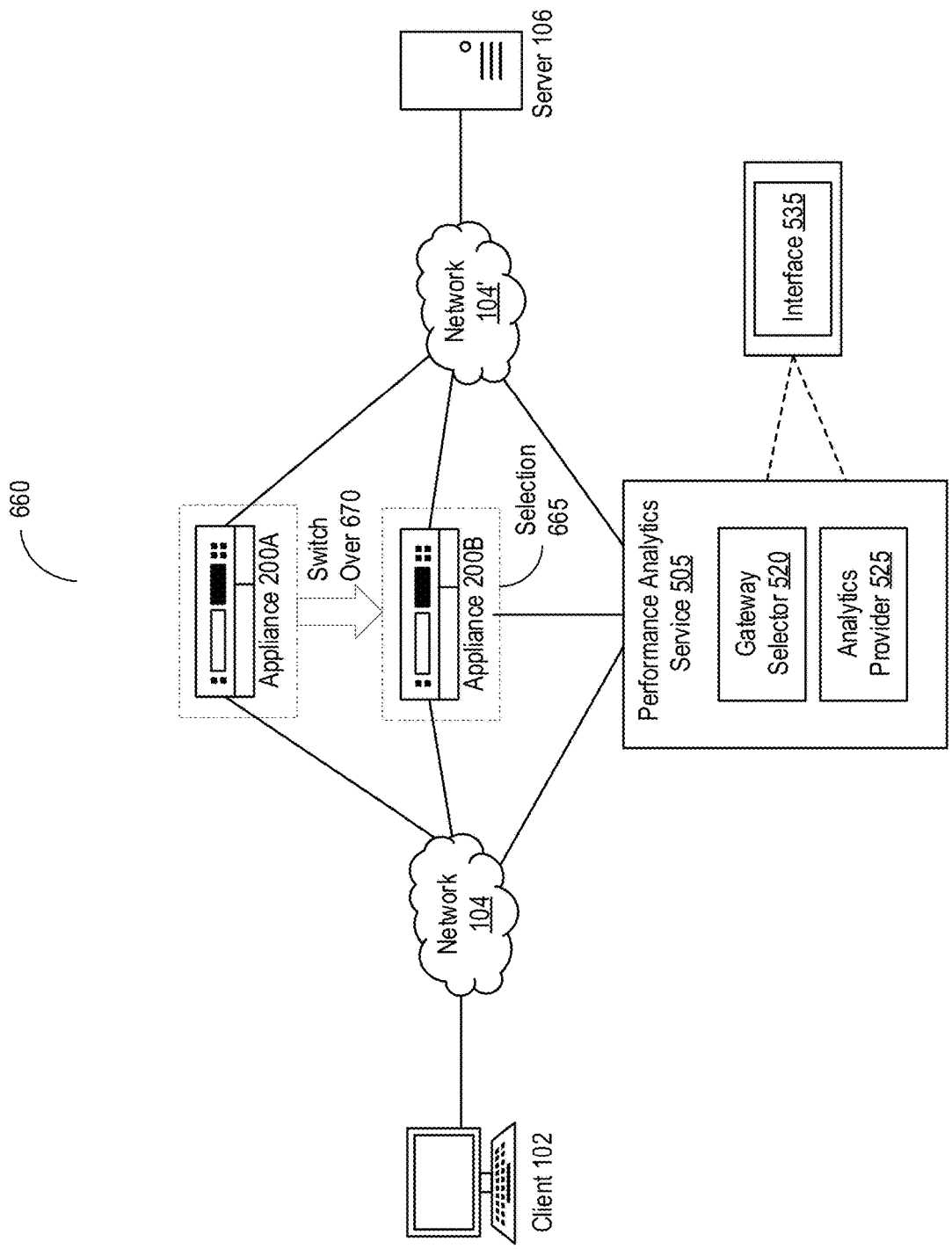
FIG. 6C is a block diagram of an embodiment of a process for switching gateways based on distances and measures of experience in the system for selecting gateways in accordance with an illustrative embodiment.

Referring now to FIG. 6C, depicted is a block diagram of a process 660 for switching gateways based on distances and measures of experience in the system 500 for selecting gateways. The process 660 may performed by the performance analytics service 505 as a continuation of the process 630 discussed above, when the user of the client 102 is determined to not have a satisfactory experience with the session. Under the process 660, the gateway selector 520 executing on the performance analytics service 505 may carry out or perform a selection 665 to identify or select at least one alternate appliance 200B from the set of appliances 200. The set of appliances 200 from which to select may depend on the type of measure determined to not satisfy the threshold. When the type of measure not satisfying the threshold is the client-gateway latency 610, the set of appliances 200 from which to select may include appliances 200 with previous connections with the client 102. In contrast, when the type of measure not satisfying the threshold is the gateway-server latency 615, the set of appliances 200 from which to select may include appliances 200 with previous connections with the server 106. The gateway selector 520 may identify the set of appliances 200 in either scenario from the database 530 maintaining the previous connections as discussed above.

In performing the selection 665, the gateway selector 520 may use the distance 640 or the 640' based on the type of measure. When the type of measure not satisfying the threshold is the client-gateway latency 610, the gateway selector 520 may find, identify, or otherwise select the appliance 200B based on the distance 640 between the client 102 and each appliance 200. For example, the gateway selector 520 may select the appliance 200B having the closest distance 640 between the client 102 and the appliance 200 among the set of appliances 200. Conversely, when the type of measure not satisfying the threshold is the gateway-server latency 615, the gateway selector 520 may find, identify, or otherwise select the appliance 200B based on the distance 640' between the server 106 and each appliance 200. For instance, the gateway selector 520 may select the appliance 200B having the closest distance 640' between the server 106 and the appliance 200 among the set of appliances 200.

With the selection 665, the gateway selector 520 may compare the initially connected appliance 200A with the selected alternate appliance 200B. In some cases, the appliance 200B of the selection 665 may be the same as the appliance 200A to which the client 102 is initially connected. In other cases (e.g., as depicted), the appliance 200B of the selection 665 may be different from the appliance 200A to which the client 102 is initially connected to in accessing the server 106. If the appliance 200A matches the appliance 200B identified from the selection 665, the gateway selector 520 may determine that the appliance 200A is to be continued for use by the client 102 in accessing the server 106. The appliance 200A may be determined to be continued for use instead of the appliance 200B or other appliances 200 in the set. In some embodiments, the gateway selector 520 may also identify or determine that the appliance 200A is the optimal gateway among the set of appliances 200 available to the client 102 for accessing the server 106. In some embodiments, the gateway selector 520 may determine that the distance 640 or 640' is not the cause for the measure of experience not satisfying the threshold.

Conversely, if the appliance 200A does not match the appliance 200B, the gateway selector 520 may determine that the appliance 200B (instead of the appliance 200A) is to be used by the client 102 to access the server 106. In some embodiments, the gateway selector 520 may also identify or determine that the appliance 200A is a sub-optimal gateway among the set of appliances 200 available to the client 102 for accessing the server 106. The gateway selector 520 may identify or determine that the appliance 200B (instead of the appliance 200A is the optimal gateway among the set of appliances 200. In some embodiments, the gateway selector 520 may determine that the distance 640 or 640' is the cause for the measure of experience not satisfying the threshold. With the selection, the gateway selector 520 may provide an indication of the appliance 200B from the selection 665 to the client 102, the appliance 200A, or the appliance 200B, among others.

In addition, the gateway selector 520 may initiate, carry out, or perform a switch over 670 to transition or move the client 102 from the appliance 200A to the appliance 200B to connect with in accessing the server 106. The switch over 670 may be performed when the appliance 200B from the selection 665 does not match the initial appliance 200A (e.g., as depicted). In performing the switch over 670, the gateway selector 520 may identify session information for the connection between the client 102 and the server 106 via the appliance 200A. The session information may include various parameters for re-establishing the connection between the client 102 and the server 106. The gateway selector 520 may then terminate the connection through the appliance 200A. In some embodiments, the gateway selector 520 may send an indication to the client 102 to terminate the connection with the appliance 200A. In some embodiments, the gateway selector 520 may send an indication to the appliance 200A to initiate switchover to the appliance 200B. With the termination of the connection, the gateway selector 520 may use the session information to establish a new connection between the client 102 and the server 106 over the appliance 200B. When established, the client 102 may access the server 106 via the appliance 200B from the selection 665.

In conjunction, the analytics provider 525 executing on the performance analytics service 505 may provide analytics information on the connections via one or more of the appliances 200 between one or more of the clients 102 and one or more of the servers 106. The provision of the analytics information may be separate or independent of the process 660. The analytics information may identify or include various measures of experience for each client 102 connected with one or more of the servers 106 via the one or more of the appliances 200. The measures of experience may include the round trip time 605, the client-gateway latency 610, and the gateway server latency 615, among others. In some embodiments, the analytics provider 525 may classify or categorize sessions between clients 102 and servers 106 by the measure of experience and ranges for the categories. For example, the categories may include excellent sessions for sessions with relatively high measures of experience, poor sessions for sessions with relatively low measures of experience, and fair sessions for relatively average measures of experience, among others.

Additionally, the analytics information provided by the analytics provider 525 may identify or include the distances 640 between the respective pairs of clients 102 and appliances 200 and the distances 640' between the respective pairs of appliances 200 and the server 106. The analytics provider 525 may identify the measures of experiences and the distances 640 or 640' to include in the analytics information. In some embodiments, the analytics provider 525 may identify or include the original appliance 200A (identified by domain name or network address) for each client 102 connected to one or more of the servers 106 in the analytics information. In some embodiments, the analytics provider 525 may also identify or include the alternate appliances 200B (identified by domain name or network address) selected for each client 102 connected to one or more of the servers 106 into the analytics information. Upon identification, the analytics provider 525 may generate the analytics information. In some embodiments, the analytics provider 525 may generate the analytics information upon receiving a request (e.g., a from a network administrator) for the information.

With the generation, the analytics provider 525 may display, provide, or otherwise present the analytics information via the interface 535. In some embodiments, the analytics provider 525 may provide the analytics information to present on the interface 535, upon receiving a request (e.g., from the network administrator). The interface 535 may be a graphical user interface for presenting the analytics information. In some embodiments, the interface 535 may be part of the same device (e.g., display) as the performance analytics service 505. In some embodiments, the interface 535 may be presented on a different device (e.g., a computing device of the network administrator) separate from the performance analytics service 505. The analytics provider 525 may send the analytics information to the devices for presentation via the interface 535. Examples of the interface 535 and the analytics information presented therein are detailed below in conjunction with FIGS. 7A-D.

Figure 7A:
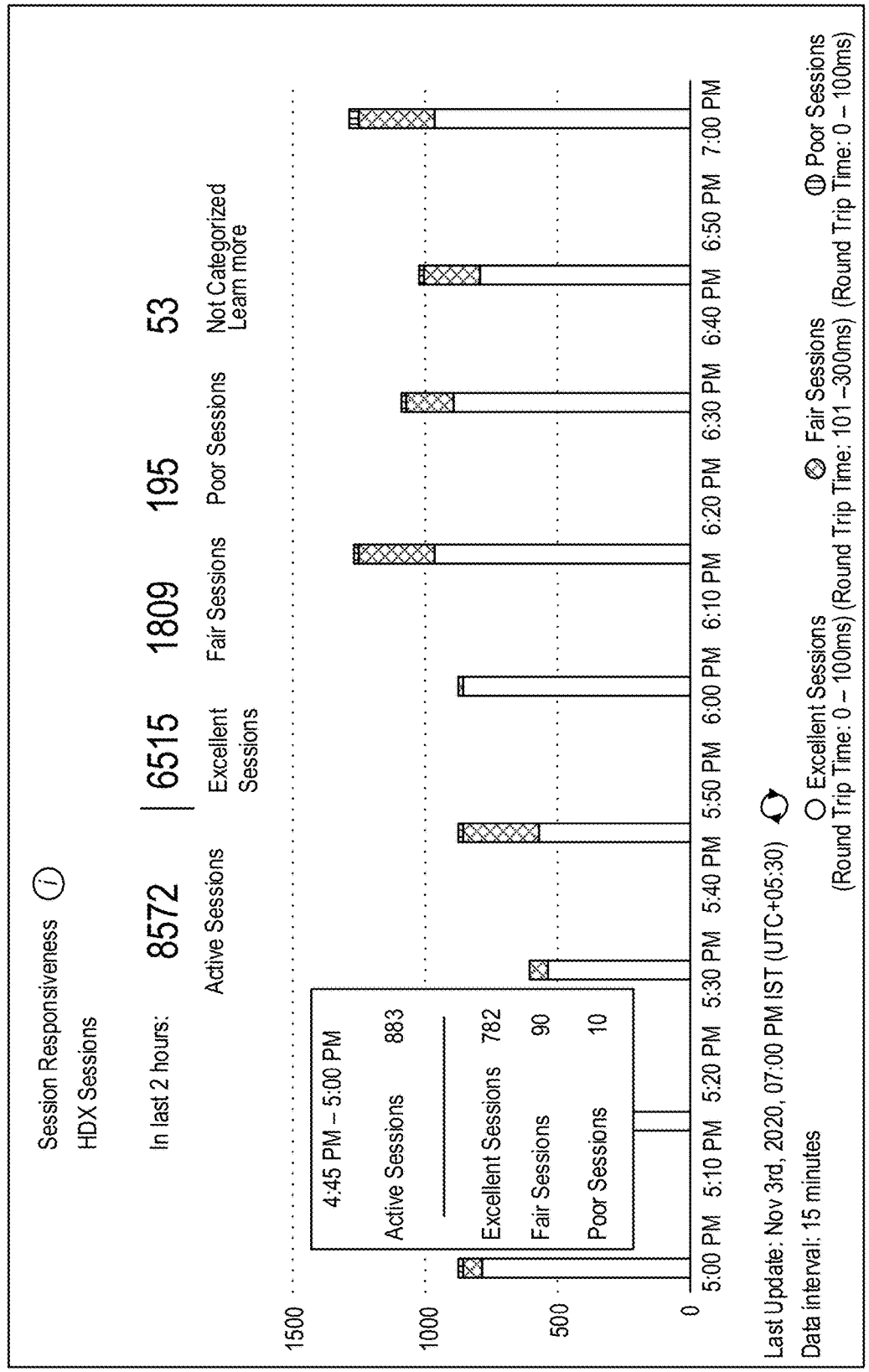

Referring now to FIGS. 7A-D, depicted are screenshots of user interfaces 700-715 for presenting performance analytics in the system 500 for selecting gateways. As depicted in FIG. 7A, the user interface 700 may present information on session responsiveness (e.g., the round trip time 605) across active sessions in the system 500 broken down by time slots of ten minute increments. The user interface 700 may further provide the number of sessions by measure of experience, such as "Excellent Sessions," "Fair Sessions," and "Poor Sessions," for a given time period (e.g., 4:45 pm to 5:00 pm). As depicted in FIG. 7B, the user interface 705 may present information on a breakdown of the session responsiveness for active sessions in the system 500. In the example, the breakdown in the user interface 705 may include sub-factors for the measures of experience, such as WanLatency (corresponding to the client-gateway latency 610), DcLatency (corresponding to gateway-server latency 615), and Host-Delay corresponding to processing time consumed by the server 106 or the appliance 200, among others. The user interface 705 may also provide categories by the number of sessions falling under those sub-factors, such as "Excellent Sessions," "Fair Sessions," and "Poor Sessions." The breakdown statistics in the user interface 705 may be for the time interval between 3:45 pm to 5:58 pm and for a select set of users.

Continuing on, as depicted in FIG. 7C, the user interface 710 may present information on sessions with high WanLatency (corresponding to the client-gateway latency 610). In the example, the information presented in an element 720 of the user interface 710 may include the number of users with poor experience with the appliance 200A (corresponding to the domain "ftl.agree.example.com") due to high WanLatency. The information of the user interface 710 may further identify which appliance 200B the clients 102 of these users should connect to (corresponding to the domain name of "blr.agree.example.com"). As depicted in FIG. 7D, the user interface 715 may present information on sessions with high DcLatency (corresponding to the gateway-server latency 615). In the example, the information presented in an element 725 of the user interface 715 may include the number of users with poor experience with poor experience with 200A (corresponding to "sin.agree.example.com") due to high DcLatency. The information of the user interface 715 may further identify which appliance 200B the clients 102 of these users should connected to (corresponding to the domain name of "blr.agree.example.com").

In this manner, the performance analytics service 505 may use various measures (e.g., client-gateway latency 605 and the gateway-server latency 610) to identify and pinpoint clients 102 with users facing poor experience in accessing the server 106. Using these identifications, the performance analytics service 505 may proactively perform the selection 665 of alternate appliances 200B and the switch over 670. By selecting geographically closer appliances 200, the switch over 670 may thus improve the experience of users at clients 102 with respect to the appliances 200 in accessing the servers 106. Moreover, the selection 665 and the switch over 670 may be carried out, without manual intervention thereby reducing the burden to the network administrator. In addition, the performance analytics service 505 may provide more broken down and detailed analytics information to allow the administrator greater abilities to diagnose and gain insight regarding the measures of experience and other metrics.

Referring now to FIG. 8, depicted is a block diagram of an architecture 800 for aggregating performance analytics. The architecture 800 may be used to implement the functionalities of various components in the system 500, such as the performance analytics service 505. As depicted, data from various data sources 805 may be aggregated by a primary event hub 810. The initial raw data may then undergo data enrichment 815, and may be further propagated to an internal event hub 820. A cluster 825 may include an application container framework 830 including various applications to gather data from the internal event hubs. The cluster 825 may include a data loading service 835 to store, maintain, and handle the data on various components, such as a storage and a set of databases 845A and 845B. The data loading service 835 may also interface with a resource manager 850 and a service bus 855.

Referring now to FIG. 9, depicted is a flow diagram of an embodiment of a method 900 for aggregating measures of session experience. The functionalities of method 900 may be implemented using, or performed by, the components described in FIGS. 1-6C, such as the performance analytics service 505. Under the method 900, a service (e.g., the performance analytics service 505) may identify gateway metrics, such as wanLatency (corresponding to the client-gateway latency 610), dcLatency (corresponding to the gateway-server latency 615), and gateway location (e.g., the location 635), among others (905). The service may identify application and desktop metrics from the server (e.g., the server 106) (910). The service may also identify workspace application metrics, such as user location (e.g., the location 635'), service machine location (e.g., the location 635"), and gateway FQDN or IP (corresponding to the domain name and network address of appliance 200). Continuing on, the service may aggregate the metrics in an extract, transform, load (ETL) layer (920). For each session, the service may calculate a distance "d1" (distance 640 between the client 102 and the appliance 200A) and a distance "d2" (distance 640' between the appliance 200A and the server 106) (925). The service may further determine user experience score on a per session basis (930).

Referring now to FIG. 10A, depicted is a flow diagram of a method 10000 for selecting gateways using wide area network (WAN) latency as a measure of session experience. The functionalities of method 1000 may be implemented using, or performed by, the components described in FIGS. 1-6C, such as the performance analytics service 505. Under the method 1000, a service (e.g., the performance analytics service 505) may determine whether the wanL (corresponding to the client-gateway latency 610) is high (1005). When the wanL is determined to be high, the service may find a minimum of distance s"d1" (distance 640 between the client 102 and the appliance 200A) from previous sessions of the user, when the user for the previous sessions is the same (1010). The service may choose the gateway "gIP" (e.g., the appliance 200A or 200B) with the lowest distance "d1" as the recommended gateway "gIP" (1015). The service may determine whether the recommend gateway is the same as the latest gateway (1020). When the recommended gateway is not the same as the latest gateway, the service may determine that the latest gateway is a sub-optimal gateway login with respect to wanL (1025). Conversely, when the recommended gateway is the same as the latest gateway, the service may determine that the latest gateway is not sub-optimal gateway login with respect to wanL (1030).

Referring now to FIG. 10B, depicted is a flow diagram of a method 1050 for selecting gateways using data center (DC) latency as a measure of session experience. The functionalities of method 1050 may be implemented using, or performed by, the components described in FIGS. 1-6C, such as the performance analytics service 505. Under the method 1050, a service (e.g., the performance analytics service 505) may determine whether the dcL (corresponding to the gateway-server latency 615) is high (1055). When the dcL is determined to be high, the service may find a minimum of distance s"d2" (distance 640' between the appliance 200A and the server 106) from previous sessions of the user, when the user for the previous sessions is the same (1060). The service may choose the gateway "gIP" (e.g., the appliance 200A or 200B) with the lowest distance "d1" as the recommended gateway "gIP" (1065). The service may determine whether the recommend gateway is the same as the latest gateway (1070). When the recommended gateway is not the same as the latest gateway, the service may determine that the latest gateway is a sub-optimal gateway login with respect to dcL (1075). Conversely, when the recommended gateway is the same as the latest gateway, the service may determine that the latest gateway is not sub-optimal gateway login with respect to dcL (1080).

Referring now to FIG. 11, depicted is a flow diagram for a method 600 of selecting gateways based on location and user experience related metric. The functionalities of method 1100 may be implemented using, or performed by, the components described in FIGS. 1-6C, such as the performance analytics service 505. In brief overview, a service may detect whether a measure is below a threshold (1105). When the measure is below the threshold, the service may determine whether the type of measure is a client-gateway latency or a gateway-server latency (1110). When the type of measure is the client-gateway latency, the service may identify gateways previously connected with a client (1115). The service may also determine a distance between the client and each gateway (1120). Otherwise, when the type of measure is the gateway-server latency, the service may identify gateways previously connected with the server (1125). The service may determine a distance between the server and each gateway (1130). The service may select the gateway based on the distance (1135). The service may determine whether the selected gateway is same as the original gateway (1140). If same, the service may continue with the original gateway (1145). Conversely, if different, the service may switch to the new gateway (1150).

In further detail, a service (e.g., the performance analytics service 505) may detect whether a measure is below a threshold (1105). The measure may include metrics related to the experience by a user at a client (e.g., the client 102) in accessing a server (e.g., the server 106) via an initial gateway (e.g., the appliance 200A). The measure may include, for example, a round trip time (e.g., the round trip time 605), a client-gateway latency (e.g., the client-gateway latency 610), and a gateway-service latency (e.g., the gateway-service latency 615), among others. When the measure is above or equal to threshold, the service may continue to monitor for the measure. When the measure is below the threshold, the service may identify whether the type of measure is the client-gateway latency or the gateway-server latency (1110). The service may have determined the round trip time is greater than a threshold. Upon this determination, the service may identify whether client-gateway latency is greater than a threshold or the gateway-server latency is greater than a threshold.

When the type of measure is the client-gateway latency, the service may identify gateways previously connected with a client (1115). The service may access a database (e.g., the database 530) to identify the set of gateways (e.g., the set of appliances 200) that the client used to connected with the server. The service may also determine a distance (e.g., the distance 640) between the client and each gateway (1120). The service may identify a network address for the client and each gateway from the previous connections. Using the network addresses, the service may determine a geographic location for the client (e.g., the location 635') and each gateway (e.g., the location 635). The service may use the locations to determine the distance between the client and each gateway.

Otherwise, when the type of measure is the gateway-server latency, the service may identify gateways previously connected with the server (1125). The service may access a database to identify the set of gateways (e.g., the set of appliances 200) that the server was previously connected to. The service may also determine a distance (e.g., the distance 640') between the server and each gateway (1130). The service may identify a network address for the server and each gateway from the previous connections. Using the network addresses, the service may determine a geographic location for the server (e.g., the location 635") and each gateway. The service may use the locations to determine the distance between the server and each gateway.

The service may select an alternate gateway (e.g., the appliance 200B) based on the distance (1135). When the type of measure is the client-gateway latency, the service may select the gateway based on the distance between the client and the gateway. On the other and, when the type of measure is the gateway-server latency, the service may select the gateway based on the distance between the gateway and the server. The service may determine whether the selected gateway is same as the original gateway (1140). If the selected gateway and the initial gateway are the same, the service may continue with the original gateway (1145). The service may also determine that the initial gateway is the optimal gateway for the client in accessing the server. Conversely, if the selected gateway and the initial gateway are different, the service may switch to the new gateway (1150). The service may use at least a portion of the session information with the initial gateway to establish the connection over the selected, alternate gateway. The service may also determine that the initial gateway was sub-optimal for the client and may identify the alternate gateway is optimal.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

I claim:

1. A method of selecting a device via which to access a server, comprising:

detecting, by a service, a measure of experience for a client device in accessing a server via a first device being below a threshold;

identifying, by the service responsive to the detection, a plurality of devices available for the client device to access the server;

determining, by the server, a distance between each of the plurality of devices and at least one of the client device or the server, responsive to identifying a latency between the first device and one of the client device or the server as below the threshold; and selecting, by the server, a second device from the plurality of devices via which the client device is to access the server based at least on the distance between the second device and at least one of the client device or the server.

2. The method of claim 1, wherein detecting the measure of experience further comprises identifying at least one of a latency between the first device and the server or a latency between the client device and the first device, as below the threshold.

3. The method of claim 1, wherein identifying the plurality of devices further comprises identifying the plurality of devices with which the client device was previously connected, responsive to a latency between the client and the first device being below the threshold.

4. The method of claim 1, wherein identifying the plurality of devices further comprises identifying the plurality of devices with which the server was previously connected, responsive to a latency between the first device and the server being below the threshold.

5. The method of claim 1, wherein determining the distance further comprises identifying, using a previously establish session, a location of at least one of the first device, the client device, or at least one of the devices.

6. The method of claim 1, further comprising providing, by the service, information on the measure of experience for the client device in accessing the server via the first device and the distance between each of the plurality of devices and at least one of the client device or the server.

7. The method of claim 1, further comprising determining, by the service responsive to the first device matching the second device selected from the plurality of devices, that the first device is to be continued for use by the client device in accessing the server.

8. The method of claim 1, further comprising determining, by the service responsive to the first device not matching the second device selected from the plurality of devices, that a distance between the first device and at least one of the client device and the server is a cause of the measure of experience being below the threshold.

9. A system for selecting a device via which to access a server, comprising:

a service having one or more processors coupled with memory, configured to:

detect a measure of experience for a client device in accessing a server via a first device being below a threshold;

identify, responsive to the detection, a plurality of devices available for the client device to access the server;

determine a distance between each of the plurality of devices and at least one of the client device or the server, responsive to identifying a latency between the first device and one of the client device or the server as below the threshold; and select a second device from the plurality of devices via which the client device is to access the server based at least on the distance between the second device and at least one of the client device or the server.

10. The system of claim 9, wherein the service is further configured to identify at least one of a latency between the first device and the server or a latency between the client device and the first device, as below the threshold.

11. The system of claim 9, wherein the service is further configured to identify the plurality of devices with which the client device was previously connected, responsive to a latency between the client and the first device being below the threshold.

12. The system of claim 9, wherein the service is further configured to identify the plurality of devices with which the server was previously connected, responsive to a latency between the first device and the server being below the threshold.

13. The system of claim 9, wherein the service is further configured to provide information on the measure of experience for the client device in accessing the server via the first device and the distance between each of the plurality of devices and at least one of the client device or the server.

14. The system of claim 9, wherein the service is further configured to determine, responsive to the first device matching the second device selected from the plurality of devices, that the first device is to be continued for use by the client device in accessing the server.

15. The system of claim 9, wherein the service is further configured to determine, responsive to the first device not matching the second device selected from the plurality of devices, that a distance between the first device and at least one of the client device and the server is a cause of the measure of experience being below the threshold.

16. A non-transitory computer readable medium storing program instructions for causing one or more processors to:

detect a measure of experience for a client device in accessing a server via a first device being below a threshold;

identify, responsive to the detection, a plurality of devices available for the client device to access the server;

determine a distance between each of the plurality of devices and at least one of the client device or the server, responsive to identifying a latency between the first device and one of the client device or the server as below the threshold; and select a second device from the plurality of devices via which the client device is to access the server based at least on the distance between the second device and at least one of the client device or the server.

17. The non-transitory computer readable medium of claim 16, wherein the program instructions further cause the one or more processors to identify at least one of a latency between the first device and the server or a latency between the client device and the first device, as below the threshold.

18. The non-transitory computer readable medium of claim 16, wherein the program instructions further cause the one or more processors to provide information on the measure of experience for the client device in accessing the server via the first device and the distance between each of the plurality of devices and at least one of the client device or the server.

* * * * *